(12) United States Patent
Benhammou (10) Patent No.: US 7,580,547 B2
(45) Date of Patent: Aug. 25, 2009

(54) ELECTRONIC TRAFFIC MONITOR

(75) Inventor: Daniel Jacques Benhammou, Denver, CO (US)

(73) Assignee: Iteris, Inc., Santa Ana, CA (US)

( * ) Notice: Subject to any disclaimer, the term of this patent is extended or adjusted under 35 U.S.C. 154(b) by 159 days.

(21) Appl. No.: 11/552,242

(22) Filed: Oct. 24, 2006

(65) Prior Publication Data

US 2008/0095403 A1 Apr. 24, 2008

(51) Int. Cl.
- *G06K 9/00* (2006.01)
- *G06K 9/46* (2006.01)
- *G06K 9/66* (2006.01)
- *G06K 9/32* (2006.01)

(52) U.S. Cl. .................. 382/103; 382/104; 382/107; 382/168; 382/194; 382/300

(58) Field of Classification Search .................. 382/103, 382/104, 107, 168, 194, 300; 348/143, 148–149; 340/907
See application file for complete search history.

(56) References Cited

U.S. PATENT DOCUMENTS

| | | | |
|---|---|---|---|
| 4,847,772 | A | 7/1989 | Michalopoulos et al. |
| 5,416,711 | A | 5/1995 | Gran et al. |
| 5,774,569 | A | 6/1998 | Waldenmaier |
| 5,809,161 | A | 9/1998 | Auty et al. |
| 5,999,877 | A | 12/1999 | Takahashi et al. |
| 6,253,064 | B1 | 6/2001 | Monroe |
| 6,353,792 | B1 | 3/2002 | Murthy |
| 6,757,328 | B1 | 6/2004 | Huang et al. |
| 6,810,132 | B1 | 10/2004 | Umezaki et al. |
| 2004/0096084 | A1 | 5/2004 | Tamoto et al. |
| 2004/0135703 | A1 | 7/2004 | Arnold et al. |
| 2004/0234136 | A1 | 11/2004 | Zhu et al. |
| 2005/0068198 | A1 | 3/2005 | Brega et al. |
| 2005/0111698 | A1 | 5/2005 | Kawai |

OTHER PUBLICATIONS

Bartolini et al., "Motion Estimation and Tracking for Urban Traffic Monitoring", 1996, pp. 787-790, 0-7803-3258-X, IEEE, Univ. of Firenze, Italy.

Bas et al., "An Easy to Install Camera Calibration for Traffic Monitoring", 1998, pp. 362-366, 0-7803-4269-0, IEEE, Northwestern Univ., Boston, MA.

(Continued)

*Primary Examiner*—John B Strege
(74) *Attorney, Agent, or Firm*—Marsh Fischmann & Breyfogle LLP (57) ABSTRACT

A method of calibrating a video image to the scene imaged is provided for which a vehicle image transit can be associated with the transit of the real-world vehicle. A path is determined by a tracking point for at least one vehicle image. A measuring vehicle image is selected, wherein the measuring vehicle image is associated with a known dimension of the real-world measuring vehicle. At a point on the path, collocated with the tracking point, a scaling factor is determined such that a measuring vehicle image dimension is associated with a real-world dimension. A number of scaling factors can then be assembled into a scaling map allowing vehicles traversing the video scene to be measured in time, by the video frame rate, and distance, by the distance of their images and scaled according to the scaling map. Other embodiments are also disclosed.

17 Claims, 4 Drawing Sheets

OTHER PUBLICATIONS

Bhandarkar et al., "Fast and Robust Background Updating for Real-time Traffic Surveillance and Monitoring", 2005, 6 pages, 1063-6919 IEEE (CSC-CVPR'05), Dept. of Comp Sci, The Univ. of GA, Athens, GA.

Blosseville et al., "Titan: A Traffic Measurement System Using Image Processing Techniques", pp. 84-88, Institut National de Recherche sur les Transports et leur Securite, France, Centre de Morphologie Mathematique, France.

Bramberger et al., "Real-Time Video Analysis on an Embedded Smart Camera for Traffic Surveillance", 2004, 8 pages, 1080-1812 IEEE Symposium (RTAS'04) Austria.

Cathey et al., "A Novel Technique to Dynamically Measure Vehicle Speed Using Uncalibrated Roadway Cameras", 2005, pp. 777-782, 0-7803-8961-1, IEEE, Univ. of Washington, Seattle, WA.

Collinson, "The Application of Camera Based Traffic Monitoring Systems", 1999, pp. 8/1-6, IEE, London, UK.

Dailey et al., "An Algorithm to Estimate Mean Traffic Speed Using Uncalibrated Cameras", 2000, pp. 98-107, 1524-9050 IEEE (ITS), vol. 1, No. 2, Univ. of Washington, Seattle, WA.

Dickinson et al., "Road Traffic Monitoring Using the Trip II System", pp. 56-60, Napier Polytechnic, UK.

Douret et al., "A volumetric multi-cameras method dedicated to road traffic monitoring", 2004, pp. 442-446, 0-7803-8310-9 IEEE (IVS), Univ. of Parma, Parma, Italy.

Douret et al., "A multi-cameras 3D volumetric method for outdoor scenes : a road traffic monitoring application", 2004, 4 pages, 1051-4651 IEEE (ICPR'04), Paris, France.

Ferrier et al., "Real-Time Traffic Monitoring", 1994, pp. 81-88, 0-8186-6410-X, IEEE, Dept. of Eng Sci, Univ. of Oxford, UK.

Fučík et al., "The Networked Photo-Enforcement and Traffic Monitoring System Unicam", 2004, 6 pages, 0-7695-2125-8 IEEE, Univ of Tech, Brno, Czech Republic.

Fung et al., "Camera calibration from road lane markings", 2003, Opt. Eng. 42(10) 2967-77, Soc. of Photo-Optical Instr. Eng., Hong Kong.

Gloyer et al., "Vehicle Detection and Tracking for Freeway Traffic Monitoring", 1995, pp. 970-974, 1058-6393 IEEE.

Huang et al., "A Real-time and Color-based Computer Vision for Traffic Monitoring System", 2004, pp. 2119-2122, 0-7803-8603-5 IEEE (ICME), Taipei, Taiwan, ROC.

Inigo, "Application of Machine Vision to Traffic Monitoring and Control", 1989, pp. 112-122, 0018-9545 IEEE (TVT), vol. 38, No. 3.

Kumar et al., "Framework for Real-Time Behavior Interpretation From Traffic Video", 2005, pp. 43-53, 1524-9050 IEEE (ITS), vol. 6, No. 1.

Kumar et al., "Bayesian Network Based Computer Vision Algorithm for Traffic", 2003, 0-7803-8125-4 IEEE, Univ. of Singapore, Singapore.

Liu et al., "Vision-Based Detection of Activity for Traffic Control", 2003, pp. 1347-1350, 0-7803-7781-8 IEEE, Univ. of Ottawa, Ottawa, Ontario, Canada.

Love et al., "Recognition of 3D Compressed Images and Its Traffic Monitoring Applications", 2000, pp. 463-467, 0-7803-6363-9 IEEE (IVS) Dearborn, MI.

Melo et al., "Detection and Classification of Highway Lanes Using Vehicle Motion Trajectories", 2006, pp. 188-200, 1524-9050 IEEE (ITS) vol. 7, No. 2.

Müller et al., "3-D Reconstruction of a Dynamic Environment with a Fully Calibrated Background for Traffic Scenes", 2005, pp. 538-549, 1051-8215 IEEE (CSVT) vol. 15, No. 4.

Panagiotopoulou, "Eye in the Sky" Project, 2004, pp. 2926-2930, 0-7803-8255-2 IEEE (Consortium), Invited Paper.

Rabie et al., "Mobile Vision-Based Vehicle Tracking and Traffic Control", 2002, pp. 13-18, 0-7803-7389-8 IEEE (ICITS), Singapore.

Setchell et al., "Vision-based road-traffic monitoring sensor", 2001, pp. 78-84, IEE (Proc.-Vis. ISP), vol. 148, No. 1.

Shimizu et al., "Image Processing System Used Cameras For Vehicle Surveillance", pp. 61-65, Japan.

Shung-Tsang Tseng et al., "Real-Time Image Tracking for Traffic Monitoring", 2002, pp. 1-5, 0-7803-7389-8 IEEE (ICITS), Singapore.

Soto et al., "Image Processing Applied to Real Time Measurement of Traffic Flow", 1996, pp. 312-316, 0-8186-7352-4 IEEE, Univ. of Chile, Santiago, Chile.

Tanikella et al., "Design of a multiple-target based automated camera repositioning system for integrating CCTV with Video Image Vehicle Detection Systems", 2004, pp. 848-852, 0-7803-8500-4 IEEE (ITSC), Washington D.C.

Woesler, "Fast extraction of traffic parameters and reidentification of vehicles from video data", 2003, pp. 774-778, 0-7803-8125-4 IEEE (ITS), Berlin, Germany.

Veeraraghavan et al., "Computer Vision Algorithms for Intersection Monitoring", 2003, pp. 78-89,1524-9050 IEEE (ITS) vol. 4, No. 2.

Xiao-Dong Yu et al., "Highway Traffic Information Extraction from Skycam MPEG Video", 2002, pp. 37-42, IEEE (ICITS), Singapore.

Xiaoming Yao et al., "High-level Representations of Temporary Traffic States Using Hasse Graph and Temporal Change Map under a Grid-based Site Model", 2005, 0-7803-8963-8 IEEE, Southwest Jiaotong Univ., Chengdu, PRC.

Xinyu Liu et al., "A feature-based real-time traffic tracking system using spatial filtering", 2001, pp. 514-518, 0-7803-7194-1 IEEE (ITSC), Oakland, California.

Zhigang Zhu et al., "A Real-Time Vision System for Automatic Traffic Monitoring Based on 2D Spatio-Temporal Images", 1996, pp. 162-167, 0-8186-7620-5 IEEE, Tsinghua Univ., Beijing, China.

ELECTRONIC TRAFFIC MONITOR

BACKGROUND

Many roadways are now monitored by video cameras. While a video camera providing a live feed to an operator has many benefits, such as allowing the operator to observe and quickly respond to changing traffic conditions without having to be physically present at the site, such systems are expensive. Government and private roadway authorities must make the most use of the resources provided. While the benefit of camera monitoring is well known, spending limited resources on the physical roadway often takes priority.

In order to gain the most use of the monitoring infrastructure, many cameras are pan-tilt-zoom (PTZ) mounted to provide operators the ability to target sections of the roadway. If the camera has been calibrated, such that the image can be accurately translated into vehicle metrics (e.g., speed and position), any movement requires recalibration to maintain accurate metrics. While fixed cameras may need only occasional calibration, they are obviously limited to fixed viewing applications.

Many factors make calibration difficult. If a camera is calibrated in one PTZ setting then returning the camera to that same PTZ setting would calibrate the image. However, many PTZ mounts are not precise enough to ensure an accurate return to the PTZ setting. For cameras with a precise PTZ mount, returning to the same PTZ setting means the camera cannot gather reliable traffic metrics while the camera is outside of the calibrated PTZ setting.

Other calibration systems require an operator to manually inform the camera system of a known measurement. Such systems require an operator to, for example, draw a line or box and inform the system of the actual dimension of the line or box. Improvements to such manual systems utilize machine recognition systems to identify landmarks associated with a known distance, for example, the distance between streetlights or lane delineation marks. However, even with such systems calibration can be difficult if the view of the landmark is obstructed, such as when lane markers are obscured by snow, gridlocked traffic, or sun glare. Resurfacing the roadway may cause such systems be unable to calibrate for extensive periods of time.

It is with respect to these and other considerations that the present invention has been developed. However, the present invention is not limited to solving the particular problems indicated above.

SUMMARY

In one aspect of the invention, a traffic monitoring system calibrates a video image based on the traffic itself A scaling map is created to associate points on a video image with the dimensions of the surface being imaged. Once the scaling map is created, an object image, such as a vehicle image, can move across the video frame and have the motion be measured in terms of real-world dimensions.

In another aspect of the invention, the gauge used to find scaling factors for points on the scaling map is the objects to be measured. Vehicle traffic can vary significantly in size, shape, color, axles, or other attribute, however similarities can be extracted from such diverse data to isolate measuring vehicles. Most vehicles can be categorized by size as, for example, motorcycles, subcompact, compact, midsized, full-sized, sport-utility-vehicle (SUV), pickup, straight-truck, and tractor-trailer. In the United States the most common (statistical mode) vehicle on most roads is the passenger car, which includes many compact, midsize, full-sized, SUV, and certain vehicles in other categories. Despite other variations, passenger cars generally have a width of 70 inches, plus-or-minus 4 inches. Therefore an image of a passenger car with correlate with a real-world dimension of the roadway.

Knowing a dimension, such as mean width, of certain vehicles ("measuring vehicles") allows a scaling factor to be developed for points along a measuring vehicle's path. In one embodiment, the path is determined by monitoring the centroid of vehicle images within the video. It is known in the art how to identify objects, such as vehicles, in a video and define a centroid for vehicle images. After a statistically significant number of vehicle paths have been observed, a lane can be defined overlaying the path of the majority of image centroids. The centroid paths may define a number of substantially parallel lanes, as well as lanes that merge or diverge.

In one embodiment, utilizing a vehicle category other then passenger cars, namely motorcycles, is considered, even though such vehicles may represent a minority of vehicles. A hypothetical histogram is created from image data of a roadway. The histogram plots vehicle image pixel sizes and the frequency thereof. While the mean and mode may fall in the range of passenger cars, the 10 to 15% range of the histogram may capture the portion of the histogram associated with motorcycles. If it is known that the mean width of a motorcycle is 30 inches, then any image size falling into the range associated with motorcycles becomes the measuring vehicle and represents 30 inches of real-world measurement for the location of the motorcycle image.

In other embodiments, the vehicle image dimension is determined from a vehicle image attribute that is not directly associated with vehicle image dimension. In a more specific embodiment, such as in certain parts of the world, there are a number of vehicles that are substantially uniform (e.g., taxis, delivery vehicles, emergency vehicles) and therefore can be correlated to dimensions of the roadway. In one embodiment, taxis are both of substantially uniform width and of a color substantially unique to taxis. An imaging system detecting a taxi by color can then utilize the taxi image width, which represents the known width of the taxi, to determine a dimension of the roadway. In other embodiments, the height and/or length are utilized as the image attribute.

The above embodiments illustrates identifying measuring vehicles from a number of vehicles with a function. The function selects vehicle images from a number of vehicle images so that the selected vehicle image is associated with a vehicle of a known dimension which may then be used to correlate the selected vehicle image dimension to a roadway dimension. The function may be an average, mode, quartile, percentile, or other statistical identification to identify a measuring vehicle image from which a known physical dimension can be correlated.

In one more specific embodiment, the function selects a measuring vehicle from the mean width of a number of vehicle images. For clarity, a line is drawn orthogonal to the direction of travel of the measuring vehicle along the leading edge of the measuring vehicle image. As is known in the art, the act of drawing such a line aids in human understanding but is not required by electronic image processing systems. The real world dimension is then determined from the image pixel dimension as modified by a scaling constant. The scaling constant S being (width, in the direction of travel, of the mean vehicle image in pixels)/(the width of the mean vehicle in inches). It should be noted that pixels are used as a unit of image measurement and inches are used as a unit of distance as a convenience and other units of measurement may be utilized. The process may then be repeated to generate a number of scaling constants for a number of points of a lane. The number of scaling points may then be mapped to the video.

Vehicles moving relative to a lane, and not necessarily within a lane, can then be measured by the progress of the vehicle image over the roadway. Various metrics can then be created from the individual vehicle data including vehicle size, speed, direction of travel, position relative to a lane, and any abnormality activity. Abnormalities may be triggered by a vehicle falling outside of the normal behavior (e.g., statistical outliers). For example, traveling in the wrong direction, unusually high or low rates of speed, frequent lane changing, or similar behavior of a single vehicle may cause the behavior to be considered abnormal. Other abnormalities may require the behavior of a number of vehicles. For example, if the speed in one lane of traffic is lower than other lanes of traffic an abnormal condition may be created such as when there is debris or a stalled vehicle in the slower lane. Similarly, if all vehicles exhibit a certain behavior, such as reduced speed, then the overall roadway conditions may be an abnormality caused by weather or high traffic volume. Alerts to human or other computerized systems may be created from the detection of abnormalities.

DETAILED DESCRIPTION

To accurately measure vehicle motion from a vehicle image on a video system, the video system needs to be calibrated to the real-world dimensions of the vehicle. The more precise the calibration, the more accurate the measurements can be. Once calibrated, the camera of the video system is constrained as motion will degrade the accuracy provided by the calibration process. This can be problematic as the utility provided by many cameras enhanced by the pan, tilt, and zoom (PTZ) feature of the camera and/or camera mounting. The motion of the camera refers to changes to the framing whereby the image framed has camera-induced apparent motion, e.g., up/down with tilt, left/right with pan, and closer/farther with zoom and results in framing a different view of the roadway. With the different view now in the frame, the transit of a vehicle image cannot be accurately correlated to the actual vehicle motion using a prior calibration. To restore accuracy a new calibration is performed.

Figure 1:
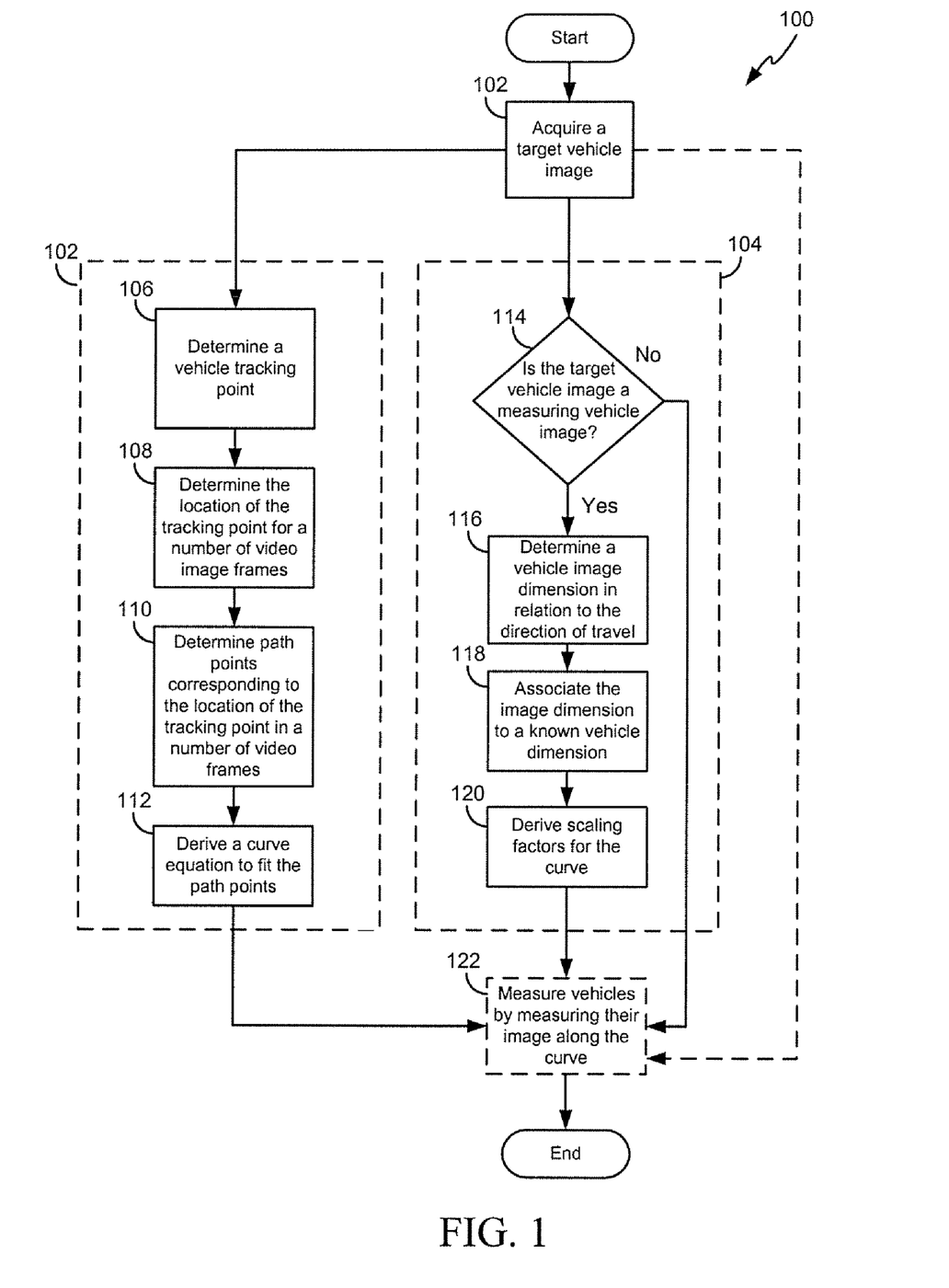
FIG. 1 illustrates a flowchart for calibrating a video image.

FIG. 1 illustrates flowchart 100 for calibrating a video image using a calibration algorithm. Path determination part 102 of the calibration algorithm determines a vehicle path. Scaling part 104 determines scaling factors to apply to the video image. Parts 102, and 104 may be implemented together to define a scaling map for the imaged roadway.

Acquisition step 102 acquires a target vehicle image. The raw video is analyzed to provide images representing a vehicle. Leaves, pedestrians, birds, trees, the roadway surface, the effects of weather, and other non-vehicle elements are excluded from processing so that processing, and the resulting data, is not tainted by non-vehicle data.

In one embodiment, the target vehicle image is measured 122 from a previously determined scaling map.

The direction of travel is determined by Formula 3, wherein first tracking point position $(x_1, y_1)$ and second tracking point position $(x_2, y_2)$ are used to compute a vector ($\vec{v}$) in the direction of travel.

$$\vec{v} = (x_2 - x_1, y_2 - y_1) \quad \text{(Formula 3)}$$

In another embodiment, a path is determined executing the steps of path determination part 102. Step 106 determines a vehicle tracking point. A tracking point (see FIG. 4, 404) may be a center of (visual) mass or center of symmetry, or other geometric center. In one embodiment, the tracking point calculated is the centroid. Using a geometric center point also provides the benefit of identifying the center of a path, which facilitates determination of at least one traffic lane when combined with a number of other vehicle center points. In other embodiments a corner, edge, or other point of the vehicle image may be used as a vehicle's tracking point. While there are advantages to selecting a tracking point internal to a vehicle image, step 106 may calculate tracking points external to the vehicle image. In one embodiment, an equilateral triangle is created by the left-leading edge corner a right-leading edge corner and a derived tracking point forming the apex of the triangle. In another embodiment, a tracking point is a determined distance from the vehicle image, such as ahead of the leading edge in the direction of travel.

Timing a vehicle provides one component used to determine a vehicle's speed. If it is known how long a tracking point took to travel a known distance, the vehicle's speed can be determined. One source of timing information is the frame rate of the video image. A tracking point, transiting through the video frame, can be tracked while within the video frame. In one embodiment, a vehicle image centroid is logged such that a number of position points will be generated for a vehicle. The number of potential path points being determined by Formula 1.

$$N = f(t_{out} - t_{in}) \quad \text{(Formula 1)}$$

In Formula 1, f is the frame rate in frames per second (fps), $t_{out}$ is the time the vehicle leaves the frame and $t_{in}$ is the time the vehicle enters the frame. It is apparent to those of ordinary skill in the art how to modify such a formula for video systems utilizing frame numbers rather than timestamps.

If a vehicle image takes a known number of video image frames to transit a known distance, and the frame rate is known, the time for the transit can be determined. Many video systems employ a timestamp, wherein each frame is provided with a time marker. Subtracting the end time of the transit frame from the start time of the transit frame provides the duration time for the transit. Similarly, a frame number can be utilized in place of a frame timestamp. The timestamp or frame number may be incorporated into the frame image or otherwise associated with its respective frame.

Step 108 determines the tracking point location for a number of frames of the video image. Step 110 determines the path point for the number of tracking point locations. In one embodiment, the path point is an X-Y coordinate relative to the frame of the video image. Path point may be determined for each frame containing a tracking point for a vehicle image. In other embodiments, such as when an equation (see step 112) can be determined with an acceptable accuracy without using all potential path points, the number of path points may be less than the total number of frames.

With a number of path points known, step 112 derives a curve equation from the path points. Equations, such as lower order polynomials and cubic spline interpolation, allow a curve fitting equation to be derived to mathematically describe the path of the tracking point from frame to frame. In one embodiment, a fifth order polynomial is derived. A fifth order polynomial provides a very high probability of accurately describing the path of a tracking point in most traffic conditions. Other embodiments may employ other curve-fitting equations as may be known in the art, such as to balance accuracy of the resulting curve equation with the performance objectives and limitations of the machine deriving the curve equation.

In one embodiment, step 112 derives an Nth order polynomial to fit the N number of tracking points. The N number of path points are used to construct an Nth order polynomial to fit the set of path points. In one embodiment, the method used to construct the Nth order polynomial is the standard Euclidian method, as is known in the art. In an optional further embodiment, the arc length of the path, described by the polynomial, is computed and divided into four equal length segments thereby providing five reference points representing equal distant segments.

The five reference points may then stored within a matrix, such as matrix X of Formula 2, along with the points of a sufficient number of other vehicle path points. In one embodiment, a path is determined by solving for the a vector ($\vec{a}$) in Formula 2:

$$X\vec{a} = \vec{y} \quad \text{(Formula 2)}$$

In formula 2, $\vec{a}$ is a column vector of common paths. In another embodiment, the points stored in the matrix are first compared to each other and partitioned based on relative proximity, which then determines the total number of distinct paths within the frame of view. Outliers are possible as individual vehicle paths may vary significantly from any determined path. Outliers are optionally discarded for path determination purposes.

In another embodiment, a scaling map is determined by executing the steps of scaling part 104 of flowchart 100. Once the distinct paths are known, step 114 determines if the target vehicle is a measuring vehicle. A vehicle is a measuring vehicle if it can be determined from the target vehicle image to have an attribute identifying it as a vehicle from which real-world dimensions can be determined from the vehicle's image in the video. In the United States and in many other countries, the majority of traffic in most regions is a combination of different midsized cars. Regardless of other dimensions, the widths of these vehicles all lie within a very tight distribution of 70±4 inches. If a roadway has a vehicle size distribution with a mean associated with midsize cars, and the width of a midsize car is known, then a vehicle image matching the mean image size can be used as a measuring vehicle. In other embodiments, the mode, percentile, quartile, or other function provides a determination if a vehicle image is, or is not, a measuring vehicle. In still other embodiments, height, length, axles, color, or other image attribute determines if a vehicle image identifies a measuring vehicle. If a target vehicle is determined by step 114 to not be a measuring vehicle, processing ends or optionally, step 122 measures the vehicle image transit based on a previous or partially determined curve and/or scale.

Once step 114 determines a target vehicle is a measuring vehicle, step 116 evaluates the image dimension, in relation to the direction of travel, for the measuring vehicle image. In another embodiment, step 114 determines the vehicle image dimension for a number of video frames. In one more specific embodiment, the dimension is width.

Step 118 associates the measuring vehicle image dimension to a real-world dimension. In one embodiment, the average vehicle width is 70 inches wide. A measuring vehicle is identified. If at one path point, the measuring vehicle image is 10 pixels wide, in the direction of travel, then step 120 applies a scaling factor of 7.0 inches/pixel to the portion of the video image collocated with measuring vehicle for the frame being examined provides a scale which can be extrapolated to the roadway, siding, other vehicles, or other dimension lying in substantially the same plane. Continuing with the previous example, if the traffic lane is 15 pixels wide, at the same path point, then the physical lane width is (15 pixels)×(7.0 inches/pixel) or 105 inches. In other embodiments, the scaling factor is be extrapolated horizontally to provide a scaling factor for all pixels representing equidistant, or nearly equidistant, images. In yet another embodiment, extrapolating horizontally comprises extrapolating orthogonally to the direction of travel.

With a scale determined for a number of points on a curve defining a path, vehicle images traversing the path can be measured in terms of speed and position. Metrics for individual vehicles can be combined to provide statistics of roadway use. Vehicle images that are outliers may trigger alerts. Alerts may be triggered by slow traffic, fast traffic, abrupt lane changes, vehicle traveling against traffic, or other condition as may be selected as a matter of design or implementation choice.

Figure 2:
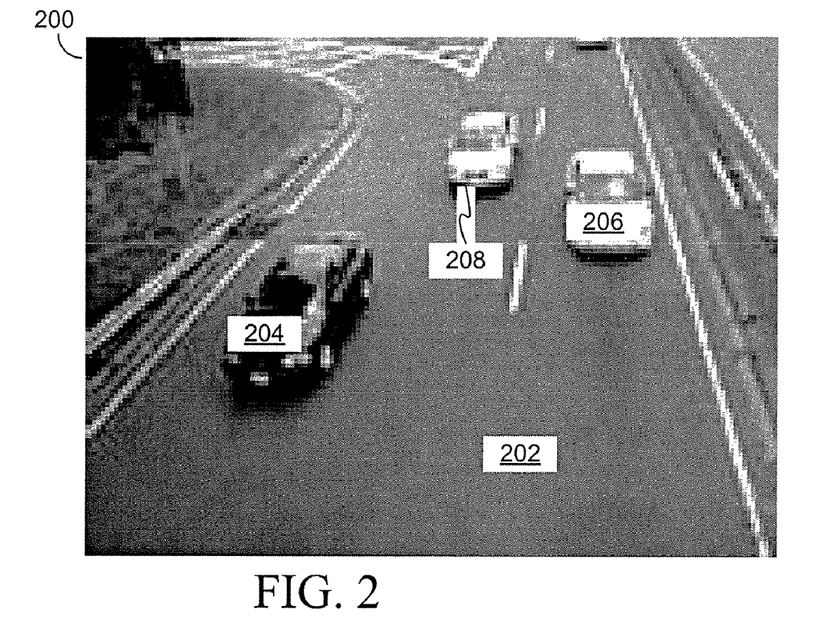
FIG. 2 illustrates a video frame of a video image capturing vehicles transiting a portion of roadway.

FIG. 2 illustrates video frame 200 of a video image capturing vehicles transiting a portion of roadway. Background 202 shows the roadway and other non-vehicle objects. Vehicle images 204, 206, 208 are also illustrated. Video frame 200 represents one frame of a video image captured by an optical video camera. In another embodiment, video frame 200 is provided by a camera operating outside of the human-visible spectrum.

Figure 3:
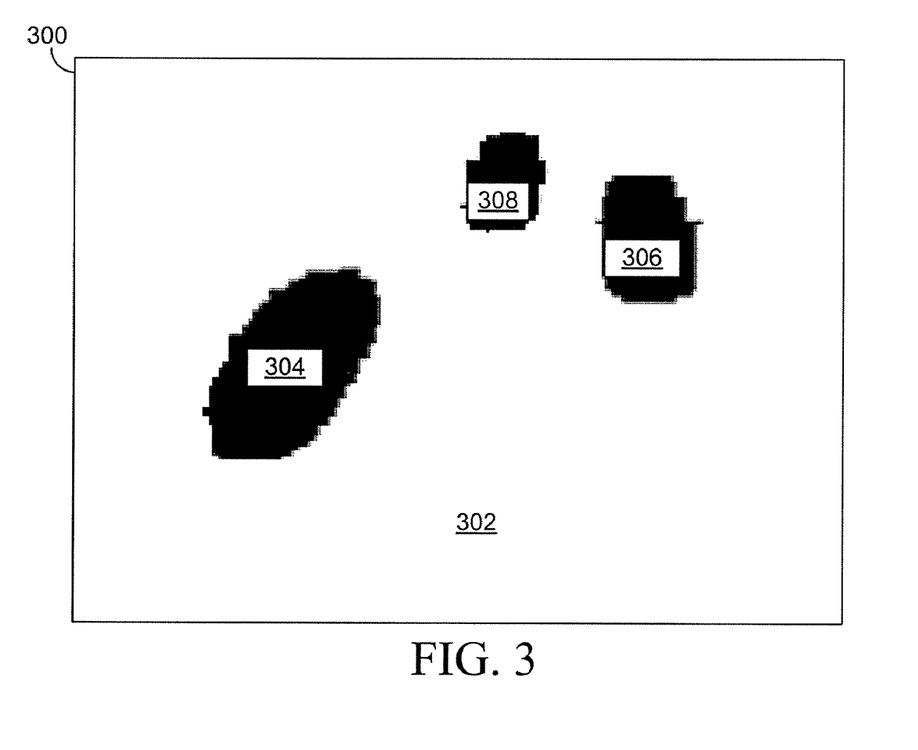
FIG. 3 illustrates a vehicle/background image.

FIG. 3 illustrates vehicle/background image 300. Binary image 300 separates non-vehicles, such as background 202, from vehicles 204, 206, 208. In one embodiment, a vehicle/background image 300 is a binary image, wherein one bit represents vehicles 304, 306, 308 and the other bit represents non-vehicles 302. Binary video images are often less burdensome on video processing resources, as compared to more complex video images. It is known in the art how to utilize motion-contrast to create binary image 300. In embodiments determining a measuring vehicle from other image attributes, such as color, shape, axles, or other attribute, one bit of video image 300 indicates such a measuring vehicle and the other bit represents non-tracking vehicles.

Figure 4:
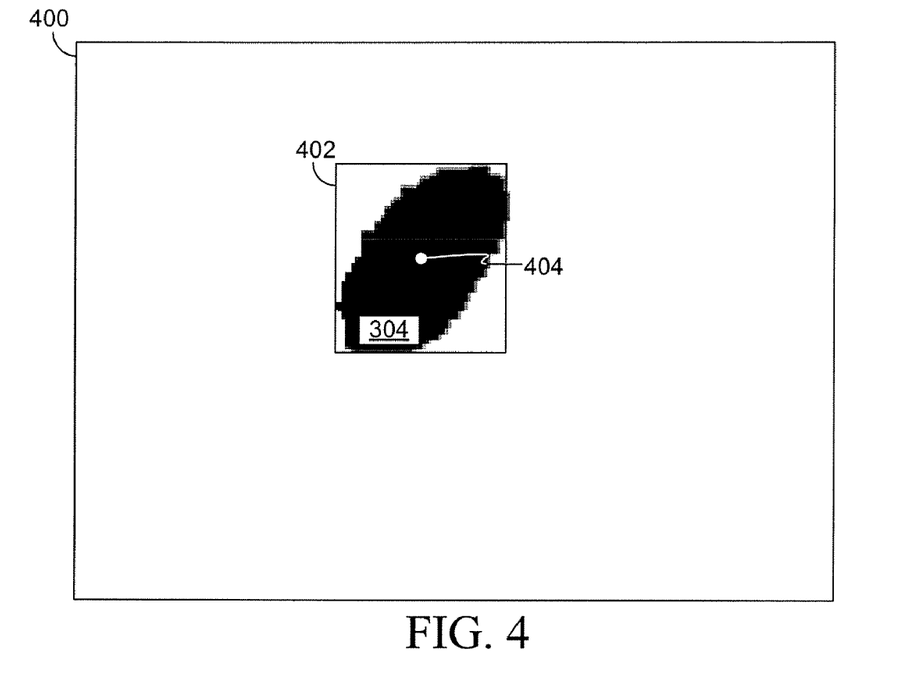
FIG. 4 illustrates a tracking point for a vehicle image.

FIG. 4 illustrates tracking point 404 for vehicle image 304. Vehicle image 304 enters the video frame, represented by single frame 400, tracking point 404 is calculated for the image of each vehicle. Tracking point 404 may be any point which can be used to indicate the position and movement of vehicle image 304. Embodiments may define tracking point 406 as a corner, edge, or other point internal or external to vehicle image 304 which may be used to track vehicle image 304. In one embodiment, tracking point 404 is the centroid of vehicle image 304.

One method of calculating a centroid is to draw box 402 around the image and calculate the center point of box 402. In another embodiment tracking point 404 is a center of (visual) mass of vehicle image 304.

Figure 5:
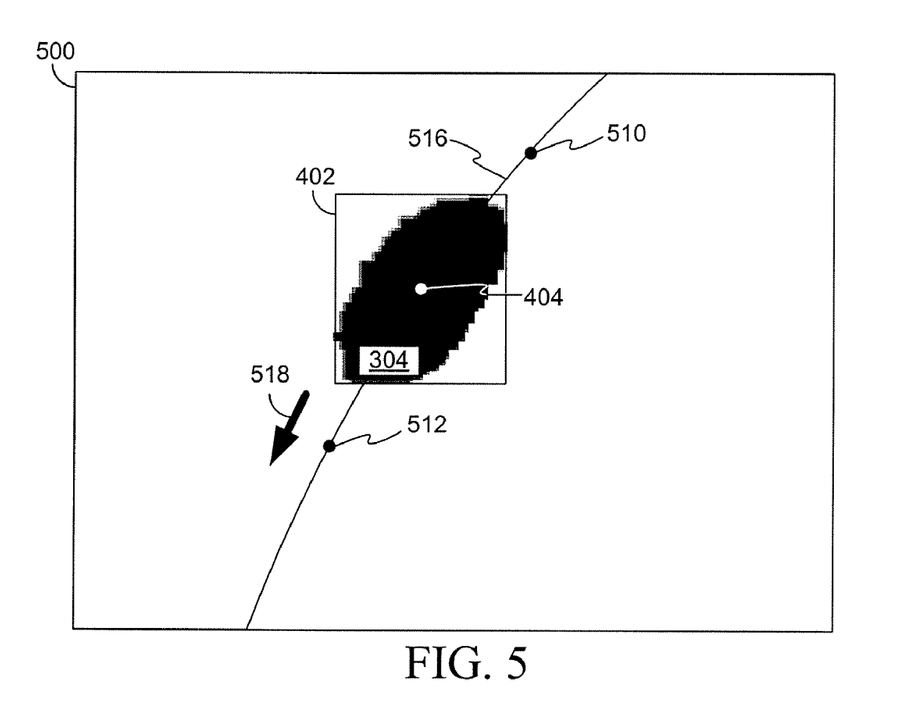
FIG. 5 illustrates a curve for the tracking point over a number of frames.

FIG. 5 illustrates curve 516 containing tracking point 404 over a number of frames. Tracking point 404 is illustrated here as it would be in one frame, as represented by video frame 500. Tracking point 510 illustrates tracking point 404 in a previous frame and tracking point 512 illustrates tracking point 404 in a subsequent frame. It is understood that while FIG. 5 illustrates 3 tracking points 510, 404, and 512 that many tracking points may be captured from additional frames. In other embodiments, the number of tracking points captured will depend on the frame rate of the camera capturing the video image, speed of the vehicle within the frame, zoom setting of the camera, frame size, position of the camera relative to the roadway, design choice, operating choice, and/or related factors.

Curve 516 is derived, such as by step 112 of FIG. 1, from tracking points 510, 404, and 512. Direction of motion 518 is determined by comparing an earlier video frame with a later video frame to derive a relative motion. In one embodiment, a motion vector is determined by utilization of Formula 3.

Figure 6:
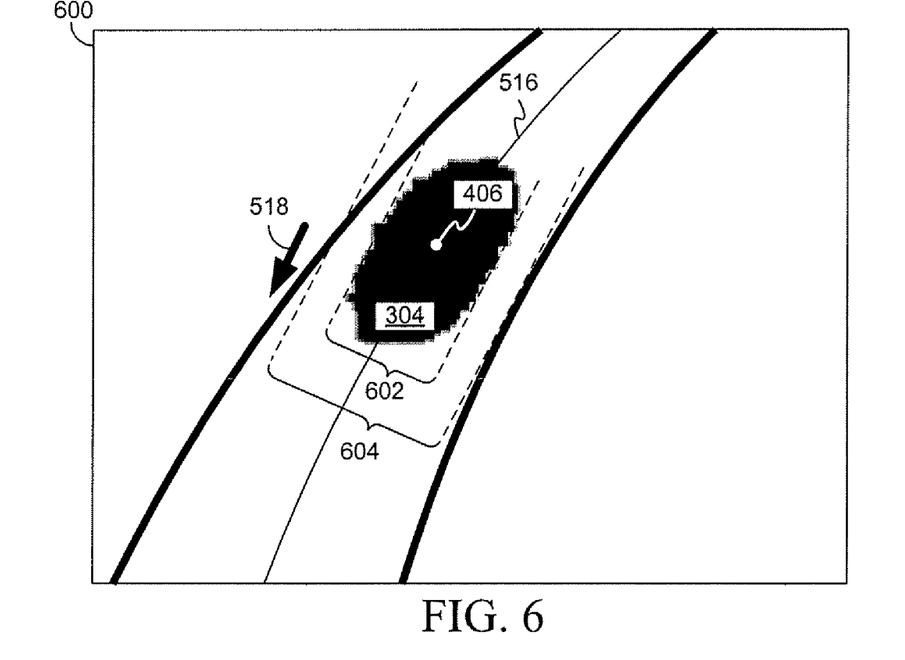
FIG. 6 illustrates a width determination.

FIG. 6 illustrates a determined width. Vehicle image 304 is determined to be a measuring vehicle. Dimension 602 is the image width (e.g., pixels) of vehicle image 304 orthogonal to direction of travel 518, at the path point collocated with tracking point 406. If the vehicle width is known (e.g., 70 inches) and pixel width 602 is known, then other dimensions of frame 600 can be known. For example, lane width dimension 604 or other vehicles.

Figure 7:
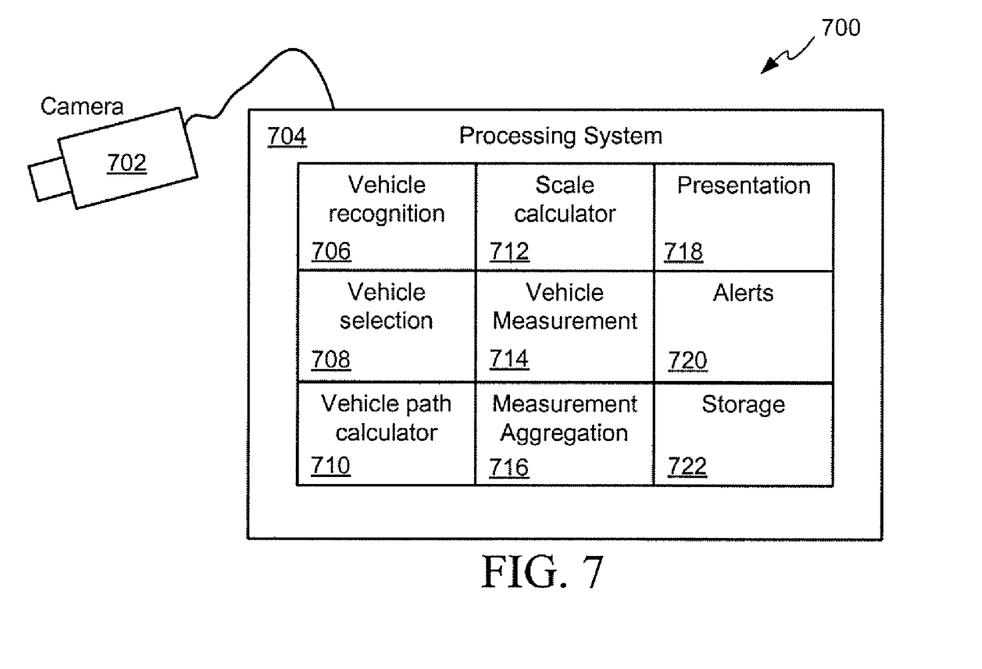
FIG. 7 illustrates a system for processing traffic information.

FIG. 7 illustrates system 700 for processing traffic information. Camera 702 provides a source of video image. In another embodiment, a recorded video source provides the video image previously captured by camera 702. Processing system 704 processes the video image into usable information, such as traffic metrics and alerts 718. processing system 704 contains a video receiver (not shown) which may be embodied as a port, socket, connection, or other hardware or software means to receive the video output of camera 702.

Vehicle recognition process 706 detects vehicles within the video image. Stationary objects (e.g., signage, road markings, trees) and non-vehicle objects such as birds and pedestrians can be removed from the image to improve downstream video processing efficiency. Vehicle selection process 708 selects a measuring vehicle wherein a real-world measuring vehicle dimension is determined from a measuring vehicle image dimension and thereby determine a scaling factor. Vehicle path calculator process 710 derives a curve equation for one or more vehicle images.

Scale calculator process 712 derives a scaling factor for a measuring vehicle image for a number of locations of the measuring vehicle's tracking point. Vehicle measurement process 714 measures a vehicle's position relative to a path (e.g., traffic lane) to determine vehicle metrics (e.g., speed, lane utilized, lane changes). Measurement aggregation process 716 provides statistics of a number of vehicles (e.g., lane count, average speed). Presentation process 718 displays individual and/or aggregated vehicle statistics (e.g., text, graphics).

Alert process 720 compares individual and aggregate vehicle statistics to acceptable values. Individual vehicle statistics, which may cause an alert to be created, may include opposite direction of travel or an excessive speed differential. Aggregate vehicle statistics, which may cause an alert to be created, may include inactive lane count, speed, and lane change count. Storage processor 722 provides a repository for raw data, video images, and/or statistics.

As those skilled in the art will appreciate, certain processes may be omitted, added, or modified without departing from the teachings herein. The processes described in FIG. 7 may be implemented as software modules, hardware, or combinations of software and hardware.

What is claimed is:

1. A method, comprising:
    using a computer to carry out the steps of:
        receiving a video image of a road surface imaged and of a vehicle moving across the road surface;
        determining a tracking point of a vehicle image, of the vehicle, captured in at least two frames of the video image;
        deriving a formula descriptive of a curve containing the tracking points;
        determining the vehicle image is a measuring vehicle by:
            obtaining a number of target vehicle images captured by the video image;
            identifying a segment of the target vehicle images by a function, wherein the function identifies at least one measuring vehicle image from the target vehicle images; and
            identifying the vehicle image as a measuring vehicle upon the vehicle image matching the at least one measuring vehicle image; and
        upon determining the vehicle image is the measuring vehicle, deriving a scaling map comprising a scaling factor associating a vehicle image dimension, in the direction of travel, to a real-world vehicle dimension at a point collocated with the vehicle image in one frame of the video image.

2. The method of claim 1, further comprising,
    segmenting the curve into segments representing roadway segments of a known length with distances determined in accord with the scaling map; and
    determining the progression of a target vehicle by determining the progression of the target vehicle's image relative to at least one segment.

3. The method of claim 1, wherein function identifies the mean vehicle image size of the number of target vehicle images.

4. The method of claim 1, wherein the tracking point is a centroid.

5. The method of claim 1, further comprising:
    receiving a number of additional vehicle images;
    determining tracking points for the number of additional vehicle images, each of the number of additional vehicle images contributing a tracking point for at least two frames of the video image; and
    determined a number of curves for each path of the number of additional vehicle images.

6. The method of claim 1, further comprising, measuring the transit of a subject vehicle by measuring the transit of the subject vehicle in a number of frames of the video image in accord with distances defined by the scaling map.

7. A system for gathering traffic information, comprising:
    a video receiver to receive a video image of a road surface and vehicles moving across the road surface;
    a vehicle recognition process to identify a vehicle image in the video image and calculate a tracking point for the vehicle image;
    a vehicle path calculator to derive a formula descriptive of a path of the tracking point through a number of video image frames;
    a vehicle selection processor for selecting a measuring vehicle by matching a candidate vehicle image to a measurement vehicle image criteria determined by a function, wherein the measurement vehicle image criteria is associated with a known dimension of a measurement vehicle;
    a scale calculator to define a scaling map comprising scaling factors for at least one point on the path and equating a dimension of the measuring vehicle image to a real-world dimension of the measuring vehicle for the one point; and
    a vehicle measurement process to determine the progression of a target vehicle from the progression of a target vehicle image along the road surface image in accord with distances defined by the scaling map.

8. The system of claim 7, wherein:
    the vehicle path calculator further derives a number of segments representing known lengths of road surface, the lengths being determined in accord with distances defined by the scaling map; and the vehicle measurement process determining the progression of the target vehicle relative to at least one segment.

9. The system of claim 7, wherein the function determines the mean vehicle image size of a number of additional vehicle images.

10. The system of claim 7, wherein the dimension of the measuring vehicle image is measured orthogonal to the direction of travel.

11. The system of claim 7, wherein determining the progression of a target vehicle includes determining time of a portion of the progression from the frame rate of the video image.

12. The system of claim 7, further comprising an alert processor to create a notification if the progression of a defined number of vehicle images are statistical outliers.

13. A computer-readable medium having computer-executable instructions for performing the steps comprising:
   receiving a video image of a road surface imaged and of a vehicle moving across the road surface;
   determining a tracking point of a vehicle image, of the vehicle, captured in at least two frames of the video image;
   deriving a formula descriptive of a curve containing the tracking points;
   determining the vehicle image is a measuring vehicle by:
      obtaining a number of target vehicle images captured by the video image;
      identifying a segment of the target vehicle images by a function, wherein the function identifies at least one measuring vehicle image from the target vehicle images; and
      identifying the vehicle image as a measuring vehicle upon the vehicle image matching the at least one measuring vehicle image; and
   upon determining the vehicle image is a measuring vehicle, deriving a scaling map comprising a scaling factor associating a vehicle image dimension, in the direction of travel, to a real-world vehicle dimension at a point collocated with the vehicle image in one frame of the video image.

14. The computer-readable medium of claim 13 having further computer-executable instructions for performing the steps of:
   segmenting the curve into segments representing roadway segments of a known length with distances determined in accord with the scaling map; and
   determining the progression of a target vehicle by determining the progression of the target vehicle's image relative to at least one segment.

15. The computer-readable medium of claim 13 wherein the function identifies the mean vehicle image size of the number of target vehicle images.

16. The computer-readable medium of claim 13, wherein the tracking point is a centroid.

17. The computer-readable medium of claim 13 having further computer-executable instructions for performing the steps of:
   receiving a number of additional vehicle images;
   determining tracking points for the number of additional vehicle images, each of the number of additional vehicle images contributing a tracking point for at least two frames of the video image; and
   determined a number of curves for each path of the number of additional vehicle images.

* * * * *